(12) United States Patent
Düppre et al.

(10) Patent No.: US 11,691,828 B2
(45) Date of Patent: Jul. 4, 2023

(54) SORTER

(71) Applicant: Wipotec GmbH, Kaiserslautern (DE)

(72) Inventors: Theo Düppre, Kaiserslautern (DE); Matthias Joachim, Pirmasens (DE)

(73) Assignee: WIPOTEC GmbH, Kaiserslautern (DE)

( * ) Notice: Subject to any disclaimer, the term of this patent is extended or adjusted under 35 U.S.C. 154(b) by 0 days.

(21) Appl. No.: 17/535,780

(22) Filed: Nov. 26, 2021

(65) Prior Publication Data

US 2022/0194716 A1 Jun. 23, 2022

(30) Foreign Application Priority Data

Nov. 27, 2020 (DE) .......................... 102020131570.8

(51) Int. Cl.
*B65G 47/71* (2006.01)
*B65G 47/64* (2006.01)
*B65G 47/68* (2006.01)

(52) U.S. Cl.
CPC ........... *B65G 47/71* (2013.01); *B65G 47/642* (2013.01); *B65G 47/682* (2013.01)

(58) Field of Classification Search
CPC ..... B65G 47/71; B65G 47/642; B65G 47/682
USPC ................. 198/369.1, 369.2, 369.7
See application file for complete search history.

(56) References Cited

U.S. PATENT DOCUMENTS

| 3,659,710 | A | 5/1972 | Tice | |
|---|---|---|---|---|
| 4,424,966 | A | 1/1984 | Chandhoke | |
| 4,651,881 | A | 3/1987 | Wallin | |
| 4,733,768 | A | 3/1988 | Aquino | |
| 4,938,336 | A | 7/1990 | Aquino | |
| 5,421,446 | A * | 6/1995 | Koch | B65G 47/647 198/570 |
| 6,550,603 | B1 * | 4/2003 | Beach | B07C 3/065 198/370.1 |
| 7,597,325 | B2 * | 10/2009 | Maierhofer | B65H 29/242 271/302 |
| 8,079,457 | B2 * | 12/2011 | Heinz | B27B 25/04 198/369.1 |
| 8,678,170 | B2 * | 3/2014 | Carrara | B65G 47/71 198/352 |
| 8,789,683 | B2 * | 7/2014 | Gadliger | B65H 29/66 198/457.07 |
| 10,087,006 | B2 * | 10/2018 | Franzaroli | B65B 35/44 |
| 11,400,492 | B2 * | 8/2022 | Berger | B65G 47/647 |

(Continued)

FOREIGN PATENT DOCUMENTS

EP 0030653 A2 6/1981
EP 1 205 266 A1 5/2002
(Continued)

OTHER PUBLICATIONS

Japanese patent application No. 2021-190779 first Office action dated Dec. 8, 2022.

*Primary Examiner* — Douglas A Hess
(74) *Attorney, Agent, or Firm* — The Culbertson Group, P.C.

(57) ABSTRACT

A sorter for sorting out discrete products includes an arrangement of adjacent sorting fingers. The sorting fingers, depending on pivoted positions, open a sorting gap in a conveying path for bad products to be sorted out or else close the sorting gap in order to support the further conveying of good products.

20 Claims, 3 Drawing Sheets

(56) References Cited

U.S. PATENT DOCUMENTS

| | | |
|---|---|---|
| 2013/0153364 A1 | 6/2013 | Bauer |
| 2017/0157650 A1 | 6/2017 | Hougen |
| 2019/0001374 A1 | 1/2019 | Bamber |
| 2021/0107035 A1 | 4/2021 | Berger |

FOREIGN PATENT DOCUMENTS

| | | |
|---|---|---|
| JP | S41-009129 A | 5/1966 |
| JP | S55-035082 U | 3/1981 |
| JP | S60-031871 A | 2/1985 |
| JP | S62-096220 A | 5/1987 |
| JP | 2018-131296 A | 8/2018 |
| WO | 2021050252 A1 | 3/2021 |

\* cited by examiner

SORTER

TECHNICAL FIELD OF THE INVENTION

The present invention relates to a sorter for sorting out discrete products from a product stream along which they travel. Such sorters are used, for example, in the production of foodstuffs that are transported discretely, i.e., as individual pieces, such as on a conveyor belt, where some of the pieces are to be sorted out of the product stream according to predeterminable criteria. For example, the product stream may include slices of meat for hamburgers, cutlets, or chops, possibly also in a frozen, rigid state. However, other foodstuffs or other products that are conveyed individually are also possible. Blister packs and other flat packages are particularly well suited for conveying and sorting.

BACKGROUND OF THE INVENTION

Sorting out individual products (also referred to herein as "bad products") from the conveyor flow is comparatively less difficult if all the products on the conveyor belt lie one behind the other in a single track, i.e., a single position transverse to the conveying direction, and have fixed track widths from the outset and are identical. Identified bad products can then be pushed sideways off the conveyor belt by means of a pusher acting transversely to the conveying direction, a blow-out device, or a diverter. Products that are not to be sorted out (also referred to as "good products" in the following) are not impacted and are instead conveyed further in the conveying direction.

However, as the conveying speed increases, the pusher or diverter must be moved back and forth very quickly at right angles to the conveying direction in order to impact each individual product to be sorted out at the right moment. This inevitably exerts high inertial forces on the pusher or diverter and high acceleration forces on the products, which can lead to damage or destruction of the products.

Also, the products (good products and bad products) often lie in a chaotic arrangement with varying dimensions in front of and next to each other on the conveyor belt, so that they are at varying distances from neighboring products or even touching each other. A pusher or a diverter is then unsuitable for sorting.

Alternatively, it is known to temporarily create a gap in the conveying path between two conveyor belts by means of retracting or folding belts for selected products, so that the selected products reaching the gap fall through it and thus out of the product flow. However, considerable design effort is required to make the belts movable back and forth into or out of the gap, because such retraction belts include at least three conveyor belts arranged one behind the other, the middle belt of which can be retracted under the first or the third belt, for example, in order to open the gap through which the product to be sorted out can fall. The time required for active sorting and retraction of the folding belt to open the gap is relatively long and therefore requires a minimum distance in the conveying direction between a bad product and a good product that is to be conveyed on instead. With high conveying speeds of up to 50 m/min and correspondingly fast-moving retracting belts, the resulting acceleration forces are too great. Furthermore, it is difficult to sort out products with dimensions that differ from each other, since the working and rest position of a pusher or a diverter can depend on these dimensions.

SUMMARY OF THE INVENTION

The present invention provides methods and devices to selectively sort out products of varying dimensions in a chaotic arrangement on a conveyor, even at high conveying speeds. The devices may be modularly expandable and have relatively short lengths in the conveying direction, preferably even shorter than the products themselves.

What is disclosed herein involves an inventive recognition that each product conveyed in a chaotic arrangement on a conveyor belt (or other type of conveyor) in a common conveying direction X defines its own track, along which it is conveyed. The position of the track in the transverse direction Y (orthogonal to the conveying direction X) and the width of the track are determined, respectively, by the position of the product on the conveyor belt in the transverse direction and its maximum width, which is also measured in the transverse direction. The tracks of several products can thus be located at many different transverse positions, have different widths and, in particular, can overlap each other. Accordingly, methods and devices disclosed here and provide ways of sorting out (sometimes also referred to as "ejecting" in the following) a bad product with special consideration of its respective track. (In the following, the terms "width" or "transverse width" refer to dimensions in the transverse direction Y, unless otherwise specified).

In an aspect of the invention, a sorting device comprises a plurality of transversely juxtaposed (preferably aligned) sorting fingers, all of which may be of the same type and which are configured and operable to support or convey the product along the regular conveying path when in their respective conveying position, but which are configured and operable also to form a sorting gap. In one aspect of an embodiment, the sorting gap is fitted to the product to be sorted out when selected ones of the sorting fingers are in their respective sorting position. That is, the sorting gap is sufficiently large to allow a bad product to be discharged through it, but not unnecessarily larger. Stated yet another way, the sorting gap, which is formed by the selected ones of the sorting fingers in their respective sorting position, is as wide as the track width of the bad product, according to this aspect. Stated still another way, the selected ones of the sorting fingers jointly encompass the track width of the bad product. In another aspect, the selected ones of the sorting fingers that jointly encompass the track width of the bad product may be limited to ones of the sorting fingers that jointly encompass only the track width of the bad product, whereas ones of the sorting fingers outside of the bad product's track width are not selected to operate in their sorting position, but rather remain in their respective conveying position. (The term "finger" may, in an embodiment, include an elongated member projecting from a pivot axis). For this purpose of sorting out a bad product, the sorting fingers are pivotable about a common pivot axis between their sorting position and their conveying position, where the axis is oriented in the transverse direction Y. The individual sorting fingers may be arranged (i.e., configured) adjacent to each other along the pivot axis, and may be arranged over the entire width of the conveyor. The sorting fingers may be identical in order to simplify the construction of the sorter and the stocking of spare parts. The device may be arranged for easily changing the sorting fingers in a modular way by adding or removing individual sorting fingers. For example, if the sorting fingers are aligned on a common axis, individual sorting fingers can simply be pushed onto or pulled off the axis.

The sorting gap may be created by pivoting a group of sorting fingers that lie partially or completely in the product track belonging to the bad product, which may be done at a time before or exactly at the moment when the bad product reaches the sorting fingers. The product to be sorted out can then fall downwards out of the product stream through the resulting sorting gap. Good products adjacent in the transverse direction Y, which lie laterally next to the sorting gap, may be conveyed further in the conveying direction X supported or conveyed on others of the sorting fingers that remaining in the conveying position. Good products arranged upstream and downstream of the bad product to be sorted out in the conveying direction may also be conveyed further by synchronizing the time window for opening the sorting gap as accurately as possible with the arrival of the bad product at the sorting gap.

The terms "good product" and "bad product" are only intended to indicate that the further transport route of a "good" product is to differ from that of a "bad" product. "Bad product" therefore simply means that further conveying of such a product in conveying direction X is not desired, and that the product is therefore selected to be sorted out of the product stream. Nevertheless, "bad products" may have desirable product characteristics and be intended for further processing or sale, while "good products" may be defective and not further processed (or may even be discarded) after being conveyed further in conveying direction X. "Good product" and "bad product" within the meaning of this application, therefore, merely indicate that these products are directed to different further routes with the aid of the sorter. In the following claims, a "bad product" to be sorted out of the product stream will be referred to as a designated product, meaning a product to be sorted out (removed) from the product stream conveyed in the conveying direction X.

With the aid of the sorting arrangement, one advantage gained, according to an aspect of the invention, is that the bad products can be discharged from a product flow of products arranged chaotically on a conveyor belt, even with non-uniform geometries, if necessary, quickly and with little design effort, irrespective of their transverse position and their width. Prior art sorters are often adapted to products with certain geometric dimensions, e.g., a square or rectangular basic shape, a maximum diameter or a diameter within tolerances, a constant edge length, a certain product height, etc. The sorter according to embodiments of the present invention makes it possible to transport or sort products independently of their geometric dimensions or of certain formats—i.e., "unformatted"—since the associated individual track is determined for each bad product on the basis of its individual dimensions. The arrangement of the products (good products and bad products) in the infeed to the sorter can also be random or chaotic, since for each product its dimensions and its track are determined individually.

A sorter according to embodiments of the invention may include a feed belt on which discrete products (good products and bad products) are conveyed in a conveying direction X. Each product defines an individually assigned track on which it is conveyed in the conveying direction. The position of the track in relation to the transverse direction Y, which is orthogonal to the conveying direction X, is defined by the corresponding transverse position of the associated product, just as the track width is defined by the width of the product in question, for example a bad product to be sorted out. The upper side of the feed belt defines a conveying plane E with the conveying direction X and the transverse direction Y. A height direction Z runs orthogonally to the conveying direction X and to the transverse direction Y.

The sorter also includes a plurality of sorting fingers, which may be narrow and lying next to one another in the transverse direction, each being movable from a sorting position to a conveying position and back. Each sorting finger is designed to form a partial gap (that is, its own respective gap) in the conveying plane in the sorting position assigned to it. This means that a bad product fed to the sorting arrangement can be sorted out through a combined sorting gap formed jointly by a plurality of adjacent partial gaps and preferably open at the bottom. Furthermore, each sorting finger is designed to close the partial gap associated with it in the conveying position in order to support from below a good product arriving at the respective sorting finger and to convey the good product further in the conveying direction.

For sorting out a particular bad product, the group of sorting fingers lying in the track of the bad product can be moved into the sorting position during a sorting time period and held there, according to the invention, in order to form a sorting gap matching the bad product in its individual track. Adjacent further sorting fingers can remain in the conveying position in order not to make the sorting gap larger than necessary or in order to support and convey adjacent good products. In order to be able to adapt the sorting gap individually to the particular bad product to be sorted out, at least three, preferably all, of the sorting fingers of the sorting arrangement are movable independently of one another from the sorting position into the conveying position and back. This also makes it possible to form one or more sorting gaps simultaneously or to open or close them while one or more other sorting gaps are already open.

In the conveying position, the individual sorting fingers preferably each lie with a respective uppermost surface, (a "conveying section") in the conveying plane. This conveying section can expediently have a drivable transport belt, which may be movably attached to the finger, in order to support the products during further conveying in conveying direction X and/or to convey them to a surface of a conveyor (a "conveying surface") downstream of the sorting fingers. The transport belt can have the same speed as the feed belt, so that good products coming from the feed belt can be conveyed further over the upper side of the sorting fingers without jerking and without delay. It is expedient that this speed also correspond to the speed at which the products are moved on downstream of the sorting arrangement in the conveying plane by any conveying means (e.g., discharge belt) that may be provided there. Instead of one or more conveyor belts (e.g., flat or round belts), other equally suitable elements can be used, such as a chain or a strap.

Preferably, the circulating transport belt is recessed on its underside (facing the sorting gap) in a recess of the sorting finger. A sorting flank formed by this underside (see below) can then guide a bad product into or through the sorting gap without the transport belt (which is guided in this section against the movement of the bad product) touching or braking this bad product in the process.

There are different variants in accordance with the present invention for creating a sorting gap by moving the sorting fingers. In one embodiment of the present invention, the sorting fingers pivot or flip with their rear section or end, as seen in the conveying direction, facing the approaching product from the conveying position upwards out of the sorting plane into the conveying path of the respective bad product (sorting position). The swivel axis for this movement is located in the area of the front end of each sorting finger, as seen in the conveying direction, facing away from the approaching product. When the sorting finger section is folded (pivoted) upwards, its underside is directed towards or faces the approaching bad product (that is, opposite to the conveying direction). This underside can serve as a sorting flank to direct the bad product downward through the sorting gap, provided that the bad product does not already fall through the gap due to gravity alone.

This steering effect can be further enhanced by a driven sorting belt arranged on the sorting flank, whose section facing the bad product moves in the direction of the sorting gap, preferably at the conveying speed of the feed belt. When the bad product comes into contact with the sorting belt, the bad product is still actively forced into or through the sorting gap in addition to the steering effect of the raised sorting finger section. In the conveying position, the sorting belt must not extend into the conveying plane, as it would then move on the upper side of the sorting finger against the conveying direction of the feed belt. Instead, the sorting belt may be guided there in a recess against the conveying direction. Alternatively, the direction of movement of the sorting belt may be reversed each time the sorting finger is swiveled (preferably automatically). In this case, the sorting belt in the conveying position may also extend into the conveying plane as a transport belt (and in this position be driven accordingly in the conveying direction) in order to convey a product in conveying direction X. In the sorting position, on the other hand, the sorting belt may be driven in the opposite direction in order to force the bad product through the sorting gap in the aforementioned manner. In this variant, the belt, which serves both as a transport belt and as a sorting belt, does not then have to be partially recessed into recesses.

In at least one embodiment, the pivoting angle of the sorting fingers between the conveying position and the sorting position is less than 90°. In at least one embodiment, the pivoting angle is approximately 60°. However, in other embodiments, the pivoting angle is not limited. In general, the pivoting angle is most preferably adjustable but may, alternatively, be fixed.

The aforementioned design, in which the sorting fingers are raised out of the conveying plane towards the approaching product, is advantageous in that the sorting finger has a dual function, on the one hand freeing the gap and, on the other hand, actively deflecting the bad product into the sorting gap with a sorting flank on the underside of the upwardly folded sorting finger. This has a disadvantage, however, in that the end of the sorting finger facing the approaching bad product moves towards it. The entire sorting finger must therefore have largely assumed the sorting position when the bad product arrives, so that the sorting gap is already sufficiently large at this point. If the bad product is immediately followed by a good product, the sorting finger must be folded back out into the conveying plane immediately after sorting in order to be able to take over the good product in the conveying plane.

An alternative embodiment provides for each sorting finger to release the partial gap between itself and a downstream adjacent conveying surface by folding away downward from the conveying position to assume the sorting position. In this variant, the sorting finger in the sorting position does not protrude into the conveying path of the bad product; instead, it folds away downward from the sorting plane, with the pivot axis located in the area of the rear end of each sorting finger as viewed in the conveying direction. The gap then opens downward "ahead in the conveying direction", so to speak.

This embodiment is advantageous in that individual sorting fingers can still be swiveled after a product has already reached them or is resting on them. If, for example, a good product rests on a selection of sorting fingers in the conveying position belonging to its track and is immediately followed in the same track by a bad product to be sorted out, the sorting fingers can initially remain in the conveying position until the good product has been transferred sufficiently far to the conveying surface adjacent to the sorting fingers (for example, by at least half its length or its center of gravity). Immediately afterwards, the sorting fingers may be folded down into the sorting position with the bad product already lying on them, in order to sort out the bad product. A good product in the same track immediately following this bad product, for example, may first be conveyed onto the sorting fingers folded down into the sorting position. After the bad product has been discharged, and while the good product is still lying on them, the sorting fingers may be folded back up into the conveying position so that the good product may be conveyed on in the normal way.

This design is particularly advantageous for processing products whose tracks partially overlap. Each product is conveyed on without being sorted out, as long as its center of gravity, viewed in the transverse direction, lies between two sorting fingers in the conveying position. It is therefore not necessary to support a product over its entire track width with sorting fingers. Instead, sorting fingers located further out in the track of the good product, which are also located in the track of a following or preceding bad product, can assume the sorting position while the good product continues to be conveyed. In this way, bad products can also be reliably separated from closely adjacent and laterally offset good products.

An additional advantage of this embodiment is that a driven transport belt on the sorting finger, which supports the further conveying of good products in the conveying position, can also be used in the same way to convey a bad product on the folded-down sorting fingers to the sorting gap and sort it out. The previously described problem of a transport belt running against the direction of rejection does not exist with the sorting fingers folding down from the conveying level.

Since in this embodiment the sorting fingers are folded down from the sorting level and thus not up into the conveying path of the products, the sorting fingers by themselves cannot fulfill both of the previously described dual functions (opening downward to form the sorting gap and while at the same time forcing bad product down from above). To supplement this function, an advantageous embodiment of the present invention provides a steering arrangement positioned above the sorting arrangement or the conveying level. This steering arrangement extends in the transverse direction over the feed belt or the sorting arrangement and includes a plurality of steering fingers which lie next to one another in the transverse direction Y and are movable (preferably pivoted) from a steering position into a release position and back. In one embodiment, at least three such steering fingers are included.

In the release position, the steering fingers are outside the conveying path of the products, so that the products can be conveyed further as good products in conveying direction X without hindrance. From the release position, each steering finger can be folded into its steering position so that a section of the steering finger is in the conveying path of a bad product and prevents further conveying of the bad product in conveying direction X. If the bad product reaches a steering flank of the steering finger facing the product in the steering position, it is subjected to a downward force acting perpendicular to the conveying plane (this perpendicular force can be merely a component of a force acting on the product at an angle to the conveying plane). The shape or orientation of the steering finger or its steering flank in the steering position is configured such that a deflecting force acting on the product orthogonally to the direction of the conveying plane is generated from the feed force of the feed belt on the bad product and directed in the conveying direction X. The deflecting force of one or more of the steering fingers in the steering position(s) assist with sorting out a bad product through a sorting gap formed by one or more sorting fingers simultaneously opened below the steering arrangement in the conveying plane.

The steering fingers have proven to be particularly effective at conveying speeds that are so high that the velocity component of the bad product in conveying direction X during the falling movement into or through the sorting gap is too large for the bad product to fall sufficiently deep before the end of the gap. That is, the steering finger(s) actively deflect the bad product downward in addition to gravitational force, thus accelerating the downward movement through the sorting gap. Furthermore, the steering finger(s) form a stop for the upward moving rear end of the abruptly stopped bad product. Due to the stop, the bad product is very quickly transferred to an almost vertical position and very quickly dives downward into the sorting gap.

Similar to the sorting fingers, the steering fingers can also be swiveled from the steering position to the release position and back. In one or more embodiments, the steering fingers are independently movable in this way. Accordingly, it is possible to select from the large number of steering fingers those which lie in the track of a bad product to be sorted out and are to act on it from above, while other steering fingers remain in their respective release position. It is not necessary to swivel all the steering fingers in the track of a bad product into respective steering position. Depending on the product and conveying speed, it may be sufficient to actuate fewer or even only one steering finger for this purpose. It is an advantage that those steering fingers in the track of a bad product and at the same time in the track of an immediately preceding or following good product can (but do not have to) maintain their release position as long as at least one steering finger in the track of the bad product can assume the steering position. In fact, it may be advantageous to deflect a bad product only in the approximate middle of its track width with only one of the steering fingers, while the other steering fingers, including the other steering fingers within the track of the bad product, maintain their release position. This saves compressed air (where compressed air provides the force to move steering fingers) and also reduces operating noise. In another, similar alternative, only the two innermost steering fingers lying in a bad product's track are moved to their steering positions. In yet another alternative, only the two outermost steering fingers lying in a bad product's track are moved to their steering positions.

It is, of course, also an alternative to swivel all steering fingers along the entire width of the track of the bad product or the sorting gap into their respective steering position in order to apply a downward force to the product to be sorted out over its entire width. It is even an alternative to swivel steering fingers adjacent to the sorting gap in the transverse direction into the steering position (as long as the steering fingers do not protrude through the conveying plane in this position or collide with the non-swiveled sorting fingers beyond the sorting gap).

Similar to the sorting fingers, the steering fingers may also be provided with a driven steering belt in the area of their steering flank, which supports or accelerates the downward movement of a product falling through a sorting gap. In at least one embodiment, the pivoting angle of the steering fingers between the steering position and the release position is less than 90°. In at least one embodiment, the pivoting angle is approximately 60°. However, in other embodiments, the pivoting angle is not limited. In general, the pivoting angle is most preferably adjustable but may, alternatively, be fixed. The swivel axis of the sorting fingers may be aligned in the same transverse direction Y as the swivel axis of the steering fingers, so that both axes run parallel to each other. In addition, sorting fingers and steering fingers may have corresponding widths and/or be located at the same positions in the transverse direction Y so that they are opposite each other in pairs in the height direction Z. This can simplify the design and control of the device.

If the sorting fingers and/or the steering fingers are provided with driven belts, it is sometimes structurally difficult to design the swivel axis at the same time as the drive axis for the belts. In an embodiment of the present application, the sorting fingers and steering fingers are designed with respect to their pivot axis and drive axis according to the disclosure of patent application DE 10 2019 127 189, the entirety of which is hereby incorporated herein by reference.

According to an advantageous embodiment of the invention, the individual sorting fingers and the individual steering fingers may each have the same width, and/or may each be opposite one another as a pair in the vertical direction and/or may each be close to one another in the transverse direction, preferably over the entire Y-width of the feed belt.

The number and transverse width of the sorting fingers or steering fingers may depend on the number of possible tracks defined by the products on the feed belt. The greater the number of sorting fingers and the smaller the transverse width of each individual sorting finger, the more precisely the sorting process can be matched to the individual product tracks, since the transverse width of a sorting gap can be increasingly approximated to the actual track width of the associated bad product as the number of sorting fingers increases. Fundamentally, this consideration also applies to the steering fingers, wherein—as already mentioned—not all steering fingers of a track have to be actuated for reversing. Consequently, the total number of steering fingers may be smaller than the number of sorting fingers. The steering arrangement, with its steering fingers lying next to each other in the transverse direction Y, may extend over the entire width of the feed belt. In an embodiment, a larger width of the individual steering fingers makes it possible to reduce the total number of steering fingers compared to the number of sorting fingers.

In an embodiment, the number of sorting fingers is greater than 5. In others, the number of sorting fingers is greater than 15. (The number of sorting fingers varies in different embodiments and may be different than these examples.) The sorting fingers may be narrow in order to be able to arrange them next to each other in a sufficiently large number and with a correspondingly fine grating ("narrow" is to be understood here with reference to the extent of the sorting fingers in the conveying direction X, which may be at least 5-10 times as large as the width of each sorting finger, for example). A preferred width of a single sorting finger may be in the range between 2 mm and 30 mm and may be between 10 mm and 20 mm, for example. (The width of sorting fingers varies in different embodiments and may be different than these examples.) With these dimensions, sorting gaps can be formed at a sufficiently large number of different transverse positions and in a sufficiently large number of different widths.

In order to be able to sort out a bad product from the product stream with the aid of the sorter according to embodiments of the present invention, its track must be known in order to be able to actuate those sorting fingers which lie in the track and whose associated partial gaps together form a sufficiently wide sorting gap for the product arriving there. In an embodiment, data describing the track may be supplied to the sorter by an external control unit to which the corresponding data are available. In another embodiment of the invention, a detector is included in the sorter for detecting and communicating the track of a product, in particular a bad product. The detector does not have to detect the track on the feed belt. It is sufficient if the track is already detected upstream of the feed belt and does not change subsequently. A product track can be described by a) a track position, defined, for example, by the position of a respective product center in relation to the transverse direction Y, and b) a track width, which is determined by the width of the respective product.

The detector may include a camera operable to record data for a product identified as a bad product and may include suitable image processing software, which may or may not be included in the camera, itself, where the image processing software is operable to evaluate the data about the product from the camera and thus determines the product track, i.e., the track position and track width. In one embodiment, the image evaluation includes determining whether the product is a bad product or a good product. Criteria that may be used for the good/bad determination include, for example, the product dimensions, a specific product color, a marking on the product, the distance to neighboring products or other optically detectable features.

In addition to the tracks of the bad products, the detector can also determine the tracks of the good products. This can be particularly useful if control of the sorting fingers or steering fingers requires knowledge of how close a good product is to a bad product.

In order to actuate the sorting fingers at the correct time, it is also necessary to determine the arrival time of the bad product at the sorting fingers. This can be calculated, for example, knowing an instantaneous longitudinal position $X_P$ of the product upstream of the sorting fingers and the conveyor speed of the feed belt. The camera-based detection for determining the track may detect the instantaneous longitudinal position $X_P$. Alternatively, for example, the detector may include sensors in addition to or instead of the camera, such as, for example, light barriers or proximity sensors, which may be arranged immediately upstream of the sorting fingers or the steering fingers. The detector may feed the results of its evaluation or its raw data to a control unit of the sorter, where the control unit is operable to process the data from the detector and to exchange data with other data processing equipment and higher-level controllers, for storing data in a memory, for reading out product or process data stored in a memory, for controlling individual components of the sorter and for generating data.

A method according to an embodiment of the invention for sorting products from a conveyor stream using a sorter, which may be a sorter such as previously described, comprises:

1. Determining the track of a bad product conveyed on the feed belt;
2. Determining the group of sorting fingers lying in the track, where the group may be a subset of all the sorting fingers;
3. Moving the sorting fingers of the group from their conveying positions to their sorting positions to jointly form a combined sorting gap and sort out the bad product through the combined sorting gap.

The determination of the track and the determination of the group of sorting fingers lying in the track according to the aforementioned process sequence can be carried out repeatedly or constantly for all products on the feed belt, in particular all bad products, preferably until they reach the sorting fingers of the sorting arrangement or the steering fingers of the steering arrangement. This can serve to check or correct previous calculation results and ensure the correct selection and timing of the fingers.

If the sorter also includes steering fingers, the method may also include the selection and control of a group of steering fingers that lie within the track of a bad product in relation to the transverse direction Y, for example, where the group may be a subset of all the steering fingers.

The sorting fingers and steering fingers used for sorting out a particular bad product may be controlled independently of one another by the control unit, and in particular in different time sequences. Thus, the control unit may cause the sorting fingers to be swiveled into the sorting position or back into the conveying position before, during or after the selected steering fingers are transferred into the steering position or the release position. Although the sorting fingers within a track may all be actuated simultaneously for the respective bad product, this does not necessarily have to be the case and, depending on the product and process parameters, may also take place one after the other. The same applies analogously to the steering fingers. According to an embodiment of the invention, the pivoting of the sorting fingers from the conveying position to the sorting position and back again may be controlled very quickly and flexibly by the control unit, as may the pivoting of the steering fingers from the release position to the steering position and back again. The sorting fingers or the steering fingers may be controlled in a time-controlled or time-optimized manner, wherein the control unit causes them to assume their desired positions in sufficient time as a function of the approaching good products or bad products and may maintain this position until it is necessary to swivel into the respective other positions.

In an embodiment, the control unit initiates action in such a way that at a point in time (or during a selectable period of time), the sorting fingers and the steering fingers simultaneously assume the sorting position or the steering position. The sorting fingers in the sorting position may be arranged parallel to the steering fingers in the steering position, and in addition or alternatively, the sorting fingers in the conveying position may be arranged parallel to the steering fingers in the release position, in order to form a channel for the bad product and good product, respectively.

From the above, it should be appreciated that in an embodiment the moving of a subset of the sorting fingers from conveying position to sorting position (of the respective sorting finger) occurs at a time when the selected product reaches the sorting gap or just before that time, which includes determining a conveying speed and a position in the conveying direction of the selected one of the products on the conveying plane and determining the time when the selected product reaches the sorting gap responsive to the conveying speed and the position in the conveying direction.

The sorting fingers or steering fingers may be driven pneumatically with a respective piston-cylinder unit (actuator) per finger. The individual piston-cylinder units together form an actuator system for the respective type of finger, sorting or steering. Each individual piston-cylinder unit may be connected to a distributor via suitable flexible compressed air hoses, which pressurizes the respective hoses with compressed air by activating a valve depending on the desired swivel movement. Due to the large number of sorting fingers, in an advantageous embodiment a valve rack common to all sorting fingers is provided. The rack extends across the width of the feed belt. Separate piston-cylinder units are included in the rack according to the number of sorting fingers, with the respective valve or valves for each piston-cylinder unit also being arranged directly in the rack. Therefore, only one compressed air supply line to the rack is required, which can be used jointly for all valves. The compressed air may be distributed to the individual cylinders via a rigid duct running in the transverse direction Y inside the rack, thus eliminating the need for a large number of separate supply lines. Alternatively to pneumatically driven actuators, one controllable electromagnetic actuator or any other type of actuator may be provided for each finger. In the same way, a rack may also be provided for the steering fingers.

If necessary, the sorting fingers or steering fingers may also be moved to intermediate positions that lie between the conveying position and the sorting position or the release position and the steering position. In various embodiments, all fingers may all be movable, depending on the actuator, either abruptly or delayed or continuously (without steps) or at a controlled speed between the individual swivel positions. In the following, the invention will be explained in more detail by means of embodiment examples.

These and other advantages and features of the invention will be apparent from the following description of representative embodiments, considered along with the accompanying drawings.

DESCRIPTION OF REPRESENTATIVE EMBODIMENTS

Figure 1:
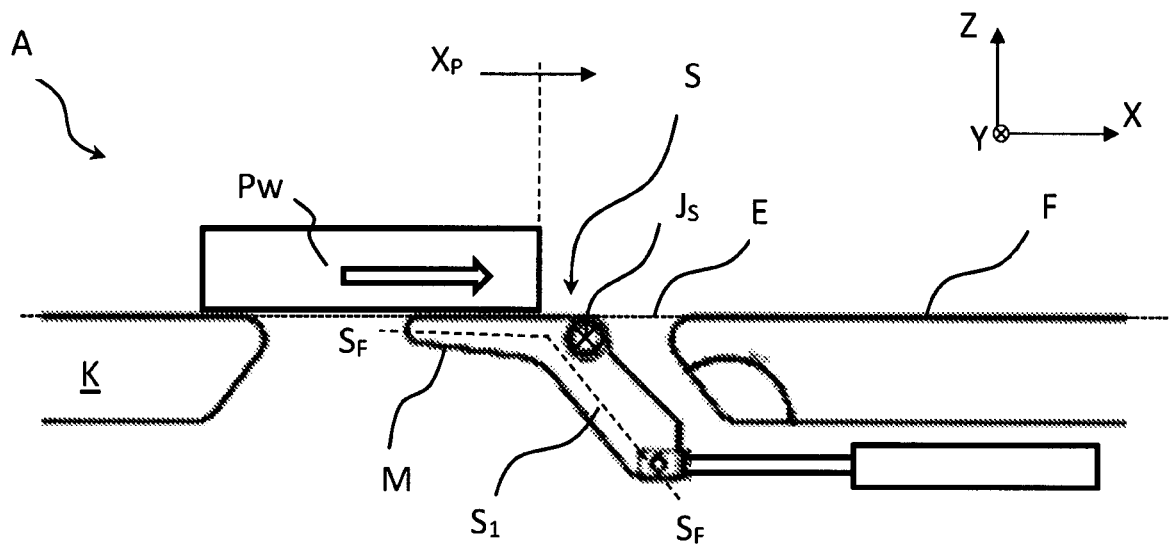
FIG. 1 shows a first embodiment of the invention in partial view with a sorting finger in conveying position.

FIG. 1 shows a simplified side view of a first embodiment of a sorter A according to the invention. The sorter A conveys individual products $P_a$, $P_w$ in a conveying stream in a conveying direction X. The products are fed—coming from a feed belt K—to a sorting arrangement S. Bad products $P_a$ to be sorted out of the conveying stream are to be discharged through a sorting gap U formed by the sorting arrangement, while good products $P_w$ to be conveyed further are conveyed further in conveying direction X onto a conveying surface F adjoining the sorting arrangement S in a conveying plane E. Each product defines an individual track by its position in the transverse direction Y and its width, along which the product is conveyed on the feed belt K in the conveying direction X (the illustrations of FIGS. 1 to 5 are side views looking in the transverse direction Y, so that the tracks of the products cannot be seen in these illustrations). The upper side of the feed belt K and the conveying surface F lie in a conveying plane E which extends in conveying direction X and in a transverse direction Y extending transversely and horizontally thereto. The vertical direction Z runs orthogonally to both directions X, Y.

The feed belt K and the conveying surface F are spaced apart from each other in the conveying direction X by an intermediate space. The sorting arrangement S is provided in this intermediate space. The sorting arrangement S comprises a plurality of narrow sorting fingers $S_1$, $S_2$, $S_3$ ... lying closely (and preferably aligned) one behind the other in the transverse direction, of which only one sorting finger $S_1$ is visible in each of the side views of FIGS. 1 to 5, covering the other sorting fingers $S_2$, $S_3$ .... The sorting fingers $S_1$, $S_2$, $S_3$ ... can be pivoted about a common sorting axis $J_S$ extending in the transverse direction Y, each sorting finger being pivotable about the sorting axis $J_S$ from a sorting position $S_T$ into a conveying position $S_F$ and back independently of the other sorting fingers. The pivoting movement can be realized by an unspecified piston-cylinder unit or by another type of actuator or drive known to the skilled person for each individual sorting finger $S_1$, $S_2$, $S_3$ ....

FIG. 1 shows the sorting finger $S_1$ in the conveying position $S_F$, each sorting finger $S_1$, $S_2$, $S_3$ ... lying in its respective conveying position, each with an uppermost section in the conveying plane E, so that a good product $P_w$ conveyed by the feed belt K can be conveyed further in conveying direction X to the conveying surface F, supported by the upper side, i.e., section, of the respective sorting finger. The conveying surface F can also be designed as a conveyor belt for removal (discharge belt). In the conveying position $S_F$, each sorting finger closes a partial gap $U_1$, $U_2$, $U_3$ ... formed by it between the sorting axis $J_S$ and the feed belt K located upstream thereof, the Y-width of each partial gap $U_1$, $U_2$, $U_3$ ... corresponding to the width of the respective sorting finger $S_1$, $S_2$, $S_3$ ....

Figure 2:
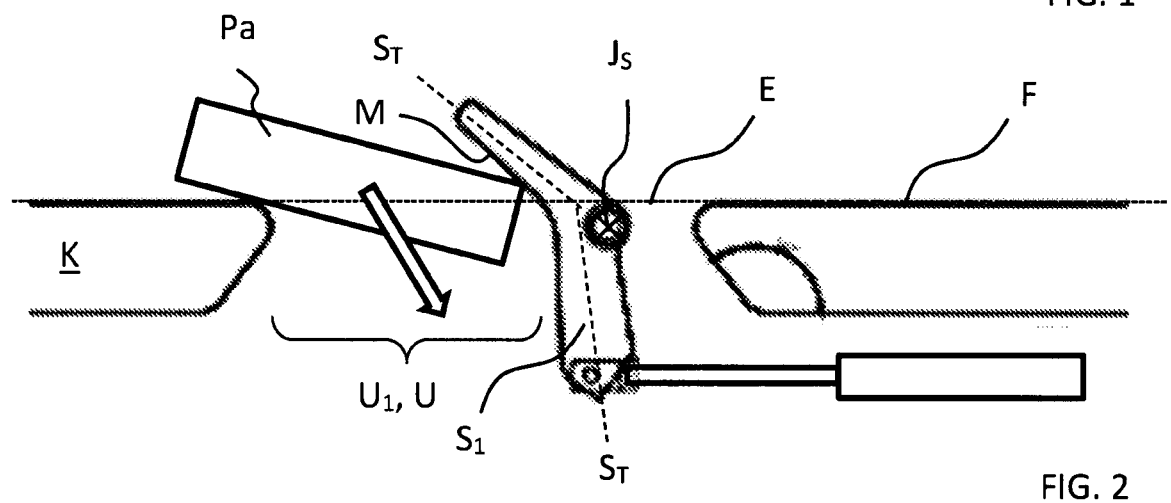
FIG. 2 shows the view according to FIG. 1 with a sorting finger in sorting position.

The upper run of a driven transport belt not shown in FIGS. 1 and 2 can be arranged on the upper side of the sorting finger in order to support the onward conveyance of the product to the conveying surface F. The transport belt speed is preferably controlled by a control unit to be identical to the conveying speed of the feed belt K and any discharge belt provided downstream.

FIG. 2 shows the sorter A according to FIG. 1, wherein the sorting finger $S_1$ has been turned up from the conveying position $S_F$ into the sorting position $S_T$ (Some further sorting fingers $S_2$, $S_3$ ... directly adjacent to the sorting finger $S_1$ have also been swung into the sorting position, which cannot be seen in this view. Further, non-swiveled sorting fingers in the conveying position are not shown in order to provide a better overview). Each sorting finger section swiveled into the sorting position protrudes with a sorting flank M upwards through the conveyor plane E. At the same time, the respective sorting finger $S_1$, $S_2$, $S_3$ ... opens its partial gap $U_1$, $U_2$, $U_3$ ..., whereby several directly adjacent partial gaps $U_1$, $U_2$, $U_3$ ... together, i.e., jointly, form a sorting gap U, in order to discharge a bad product $P_a$ downward through the sorting gap U. In order to eject a bad product $P_a$ from the product stream, those sorting fingers which lie in the track of the respective bad product are each swiveled into their respective sorting position $S_T$. Further, each sorting finger outside the track adjacent to this in the transverse direction Y can maintain the conveying position $S_F$ in order to be able to continue conveying good products $P_w$ in their respective product tracks onto the conveying surface F.

Figure 3:
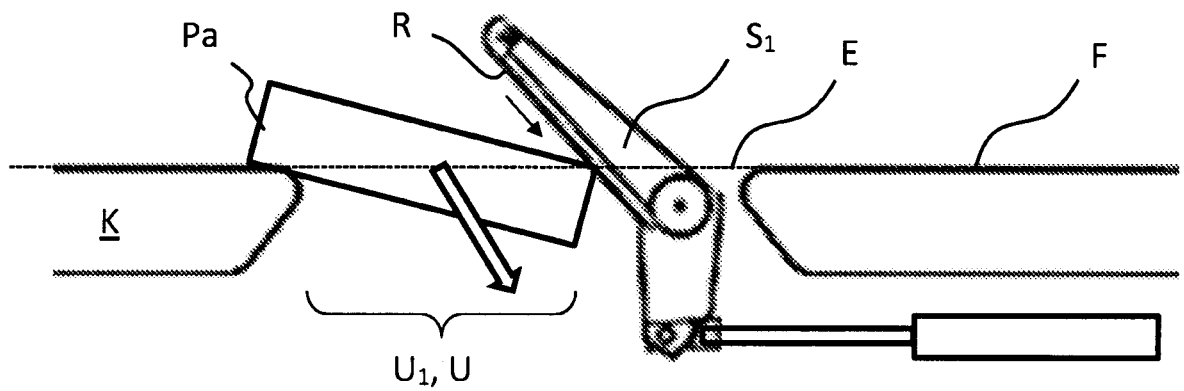
FIG. 3 shows the view analogous to FIG. 2 with a sorting belt on the sorting finger.

In the sorting position, the sorting flanks M facing the approaching bad product $P_a$ serve on the one hand to open the respective partial gap $U_1$, $U_2$, $U_3$ . . . . In addition, when the flanks come into contact with a bad product, the flanks apply to the approaching bad product a component of a deflecting force directed perpendicular to the conveyor plane E, in order to force the bad product out of the conveying direction X and down through the sorting gap U. To enhance this effect, a simplified variant shown in FIG. 3 provides the lower run of a driven sorting belt R on the sorting flank M of the sorting finger. The sorting belt R is driven in the direction of the small arrow in order to actively force a bad product $P_a$ contacting the sorting belt downwards through the sorting gap.

The embodiments according to FIGS. 1 to 3 are characterized by the fact that, for sorting, the sorting fingers fold upwards with a section from the conveying position $S_F$ into the conveying path or track of a bad product $P_a$, so that the respective partial gap $U_1$, $U_2$, $U_3$ . . . and the jointly formed sorting gap U open towards the approaching product. The upwardly projecting section of the sorting finger can perform the dual function of opening the respective partial gap $U_1$, $U_2$, $U_3$ . . . on the one hand and, on the other hand, blocking the conveying path of the bad product $P_a$ in the direction of the conveying surface F in order to divert the bad product. In this case, the sorting axis $J_S$ is located downstream of the partial gaps or the sorting gap U with respect to the conveying direction X.

Figure 4:
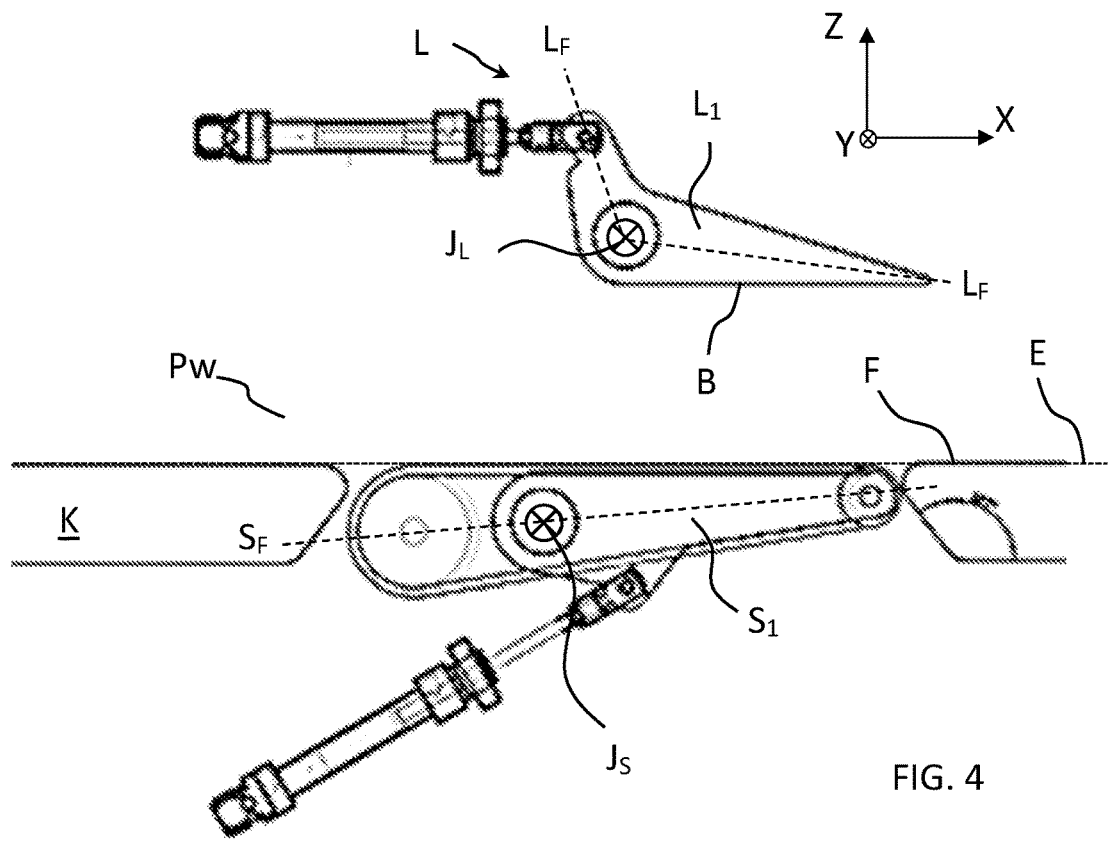
FIG. 4 provides a simplified side view of an alternative embodiment of the invention with steering fingers.
Figure 5:
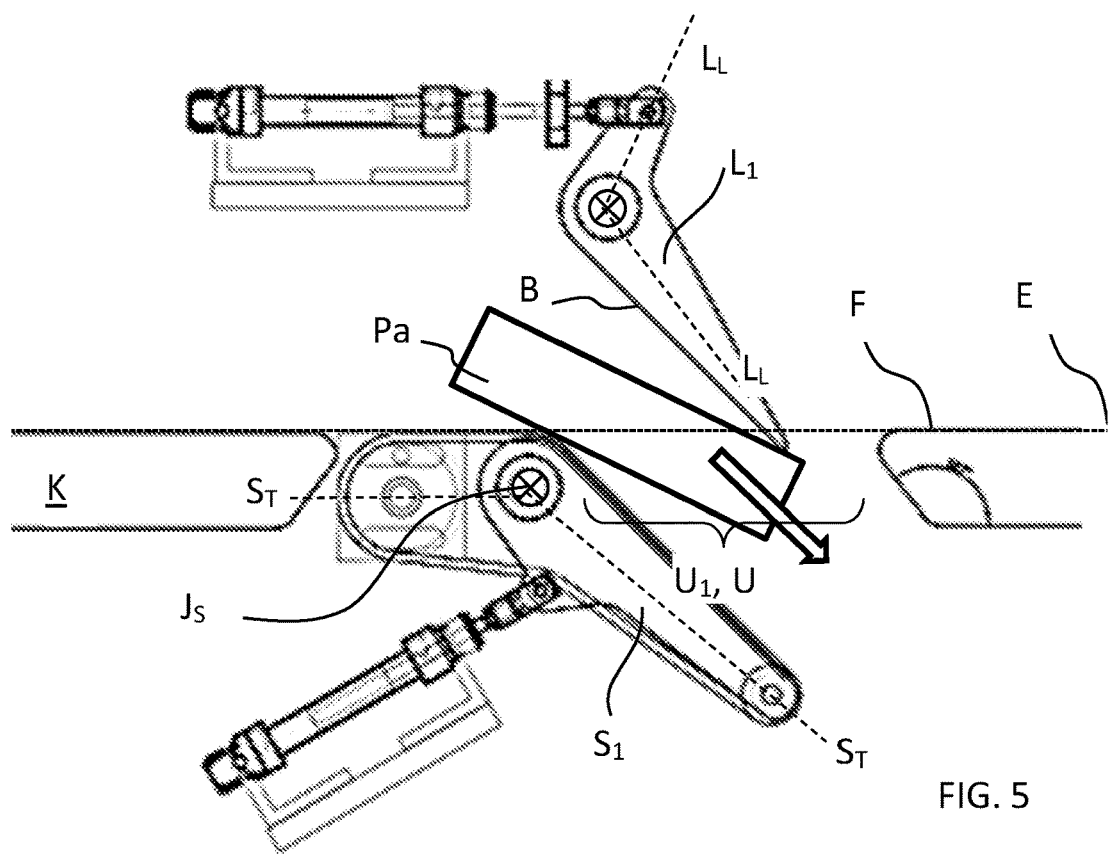
FIG. 5 shows the view according to FIG. 4 with the steering finger or sorting finger folded down, and FIG. 6 provides a simplified perspective view of a sorter with sorting fingers and steering fingers.

An alternative embodiment of a sorter according to the invention is shown in FIGS. 4 and 5. There, too, a sorting arrangement S with a plurality of sorting fingers $S_1$, $S_2$, $S_3$ . . . is arranged in an intermediate space existing between the feed belt K and the conveying surface F, which in this respect is analogous to the examples described for FIGS. 1-3. Again, the sorting fingers can be pivoted about a common sorting axis $J_S$ running in the transverse direction Y from respective conveying positions $S_F$ into sorting positions $S_T$ and back. In the conveying positions $S_F$, they lie with respective uppermost sections in the conveyor plane E. However, in this embodiment the sorting fingers are folded downwards out of the conveyor plane E in order to assume the sorting positions $S_T$, as can be seen in FIG. 5. The respective partial gap $U_1$, $U_2$, $U_3$ . . . of each sorting finger $S_1$, $S_2$, $S_3$ . . . opens in relation to the conveying direction X downstream of the sorting axis $J_S$ which is the reverse of the embodiment described for FIGS. 1-3. An advantage of this embodiment shown in FIG. 5 is that it is still possible to swivel the sorting fingers even if a feed belt or bad product has already reached the sorting fingers or is resting on them. This increases the flexibility in controlling the sorting fingers and makes it even easier to selectively sort out or convey products that are very close to each other in conveying direction X or in transverse direction Y. However, unlike in the embodiment examples illustrated in FIGS. 1 to 3, the sorting finger cannot be used here to actively divert a bad product. Instead, only gravity acts on the bad product moved into the sorting gap for sorting out. At high conveying speeds, the bad product may therefore not fall sufficiently deep before the end of the sorting gap is reached, and as a result will strike the adjacent conveying surface F.

In order to overcome this disadvantage, the sorter may be equipped with a steering arrangement L arranged above the conveyor plane E, as shown in FIGS. 4-5. Similar to the sorting arrangement, the steering arrangement L comprises a plurality of steering fingers $L_1$, $L_2$, $L_3$ . . . , which may be narrow and arranged one behind the other in transverse direction Y (preferably in alignment), as illustrated, and which are operable to be pivoted about a common steering axis $J_L$ running in transverse direction Y. The steering fingers are also operable to be pivoted independently of one another, for example by means of a piston-cylinder unit or a drive acting in the same way. In respective release positions $L_F$, the steering fingers $L_1$, $L_2$, $L_3$ . . . lie outside the conveying path of the products so that, in particular, good products $P_w$ can be conveyed under the steering fingers onto the conveying surface F. In a steering position $L_L$, on the other hand, each steering finger protrudes with a steering flank B into the track of the product(s) to prevent further conveyance of the product(s) onto the conveying surface F. (FIGS. 4 and 5 show only a first steering finger $L_1$. Further steering fingers lying behind it in the transverse direction Y in the release position or the steering position cannot be seen or are not shown for reasons of clarity).

The steering fingers $L_1$, $L_2$, $L_3$ . . . can be used to actively steer a bad product $P_a$ through a sorting gap U created by sorting fingers $S_1$, $S_2$, $S_3$ . . . located in the corresponding track in the sorting position. Similar to the sorting flanks M of the sorting fingers in the embodiments of FIGS. 1 to 3, a steering finger swiveled down into the steering position $L_L$ generates a component of a deflection force acting downward perpendicular to the conveyor plane on a bad product when it reaches the steering flank B of the respective steering finger.

FIG. 5 illustrates this case. A bad product $P_a$ to be sorted out is to be discharged through a sorting gap U formed jointly by several adjacent sorting fingers $S_1$, $S_2$, $S_3$ . . . . The sorting fingers lying in the track of the bad product $P_a$ are each folded down into their sorting position $S_T$ for this purpose. Furthermore, some of the steering fingers $L_1$, $L_2$, $L_3$ . . . lying in the track of the bad product are folded down from their respective release position $L_F$ into their steering position $L_L$. The folded-down steering fingers and sorting fingers together form a channel that leads through the sorting gap U. The bad product $P_a$ reaching the sorting gap U is conveyed into and through the sorting gap U by contact with the steering flanks B, in addition to the effect of gravity on the product and is thus sorted out. The movements of the sorting fingers and the steering fingers can be simultaneous or staggered, preferably depending on the conveying speed, the product dimensions or other physical product properties as well as the arrangement of other products (good products and bad products) on the feed belt K.

The number, transverse position, and width of the individual steering fingers $L_1$, $L_2$, $L_3$ . . . do not have to correspond to those of the individual sorting fingers $S_1$, $S_2$, $S_3$ . . . . In an embodiment, the number of steering fingers is smaller than that of the sorting fingers, since not all steering fingers have to be swiveled into the steering position in the track of the product in order to deflect it.

Figure 6:
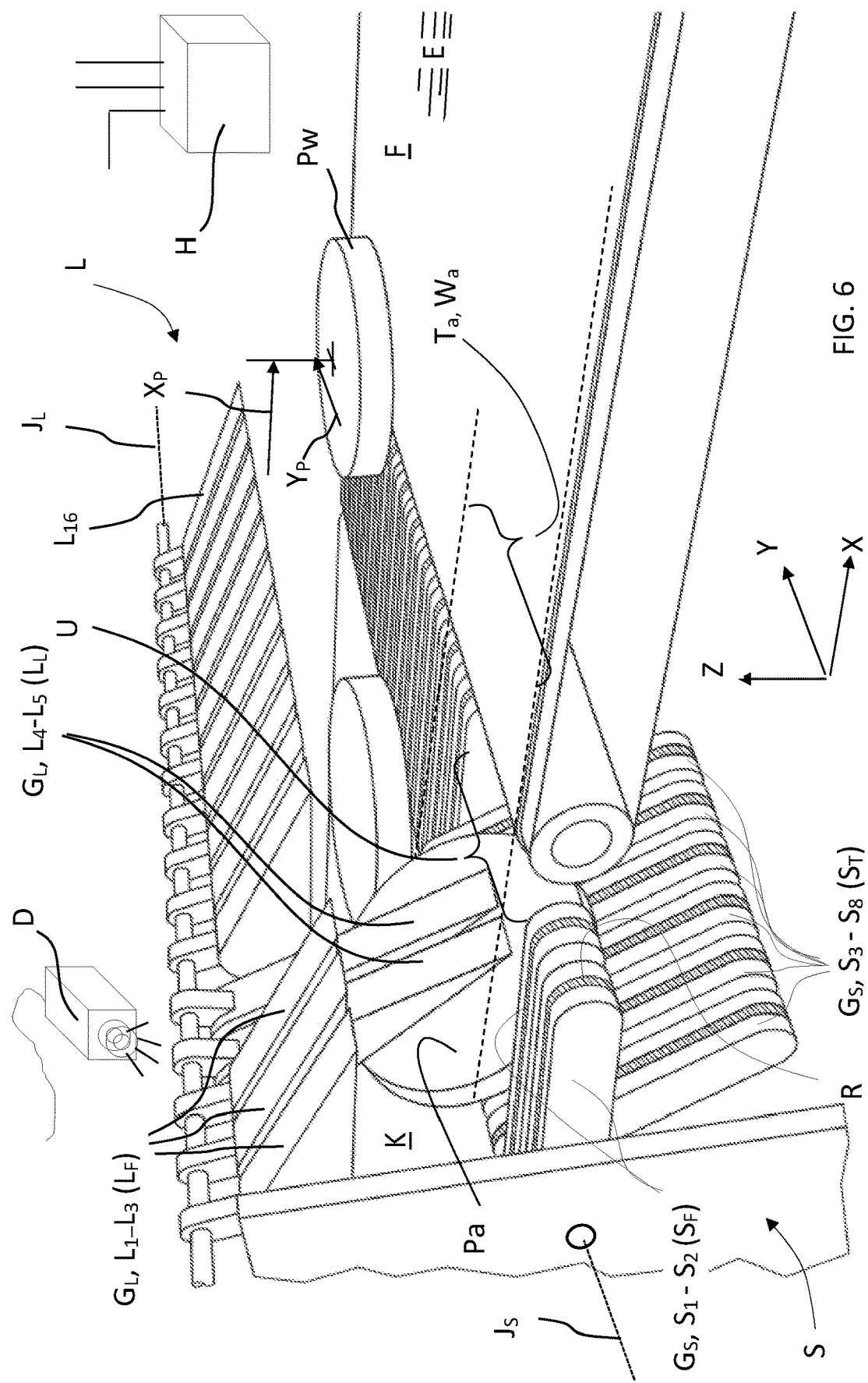

FIG. 6 shows a simplified perspective view of the design according to FIGS. 4 and 5. On the feed belt K, good products $P_w$ to be conveyed further and bad products $P_a$ to be discharged are conveyed to the sorting arrangement S in the conveying direction X. Each product defines its own track. A product Pa to be rejected with the transverse width $W_a$ measured in transverse direction Y is conveyed in its corresponding track $T_a$. The position of each product is determined by its transverse position $Y_P$ and its longitudinal position $X_P$, for example relative to the center of gravity or center point of the product relative to a fixed reference point. With the aid of detector D, the current position and/or the associated track on the feed belt may be determined once or repeatedly for each product to be sorted out or conveyed on. The track $T_a$ of the product $P_a$ to be sorted out is indicated in FIG. 6 and is determined by its position and width; the tracks of the other two products are not shown in more detail for reasons of clarity.

In order to be able to discharge the product $P_a$ from the product stream, the sorting fingers of a group $G_S$ (in the present case the subset $S_3$ to $S_8$ of the sorting fingers) are folded down from their conveying positions $S_F$ into their sorting positions $S_T$, thereby jointly forming a sorting gap U in the conveying path of the product $P_a$. All the other sorting fingers remain in their conveying positions $S_F$, which includes the group $G_S$ with the sorting fingers $S_1$ and $S_2$ on one side of the sorting gap U as well as all the other group of the sorting fingers (not indexed in FIG. 6) on the other side of the sorting gap.

In order to facilitate the discharge, the steering fingers $L_4$ and $L_5$ of a group $G_L$, which lie in the track $T_a$ of the product $P_a$, are folded down from their release positions $L_F$ into their steering positions $L_L$ by the steering arrangement L with 16 steering fingers positioned above the sorting arrangement S. The product $P_a$ reaching the steering fingers $L_4$, $L_5$ is acted upon by these with a downward component of a deflecting force, so that the product in addition to gravity is also actively forced through the sorting gap U. Other good products $P_w$ that are not to be discharged can meanwhile be conveyed further onto the conveyor surface F, which is designed as a discharge belt, via the sorting fingers remaining in their respective conveying position $S_F$. Accordingly, steering fingers that are not required assume the release position $L_F$ (in the case shown, these are the groups $G_L$ with the steering fingers $L_1$ to $L_3$ and $L_6$ to $L_{16}$). Not all steering fingers in the track of a product $P_a$ to be sorted out must be folded down to their respective steering position $L_L$. Depending on the nature of the product and the conveying speed, it may be sufficient to use only one or two steering fingers for this purpose. These can be, for example, the two middle or the two outer steering fingers of the associated track. If the product is to be discharged safely by gravity alone, there may be no need to operate the steering fingers at all. As soon as a product to be discharged has passed through the sorting gap U, the fingers actuated for this purpose can be folded back up into the release position or conveying position, unless a directly following product to be discharged justifies retaining the previous finger position.

The sorting fingers are equipped with a transport belt R, the upper run of which moves in the conveying direction X at the speed corresponding to the feed belt K and the discharge belt F, in order to be able to convey a good product $P_w$ lying on it in the conveying position $S_F$ or in the sorting position $S_T$ with as little delay as possible.

A control unit H, shown only in simplified form, is used to determine the tracks $T_a$ of the products to be sorted out and their longitudinal positions $X_F$ by evaluating the signals from detector D, which may include a camera and image recognition software, in order to control the appropriate sorting fingers and the steering fingers at a suitable time. The control unit can also process or generate signals relating to the conveyor speed, the product characteristics, the number of rejections, etc., and output or receive them via suitable interfaces. As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature. For an example specific to the following claims, in a structure having a number of sorting fingers, the a limitation that each sorting finger is moveable between one position and another is intended to encompass a structure having a number of sorting fingers that are moveable and also having an additional sorting finger that is not moveable between one position and another.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE CHARACTERS

A Sorter
B Steering flank
D Means of detection
E Conveyor plane
F Conveying surface
$G_L$ Group of steering fingers
$G_S$ Group of sorting fingers
H Control unit
$J_L$ Steering axis
$J_S$ Sorting axis
K Feed band
L Steering arrangement
$L_1$, $L_2$, $L_3$ . . . Steering fingers
$L_F$ Release position
$L_L$ Steering position
M Sorting flank
$P_a$ Bad product to sort out P_w Good product to convey on
R Transport belt
S Sorting arrangement
$S_1, S_2, S_3 \ldots$ Sorting finger
$S_F$ Conveyor position
$S_T$ Sorting position
$T_a$ Track of a product to be sorted out
U Sorting gap
$U_1, U_2, U_3 \ldots$ Partial gap
$W_a$ Width of a product to be sorted out in transverse direction Y
X Conveyor direction
$X_P$ Longitudinal position of a product
Y Transverse direction
$Y_P$ Transverse position of a product
Z Vertical direction

The invention claimed is:

1. A sorter for sorting products from a product stream conveyed in a conveying direction along a conveying plane, the sorter comprising:
(a) at least three sorting fingers located beside one another in a transverse direction extending orthogonally to the conveying direction and parallel to the conveying plane, each sorting finger (i) being movable between a respective sorting position and a respective conveying position and having a conveying section oriented along the conveying direction, (ii) when in the respective conveying position the conveying section of the respective sorting finger aligns with the conveying plane for providing support along a portion of the conveying plane, and (iii) when in the respective sorting position the conveying section of the respective sorting finger is removed from the conveying plane so as to form a respective gap in the conveying plane; and
(b) a sorting finger actuator system operable for selectively causing each of the sorting fingers to move from its conveying position to its sorting position and then back to its conveying position, the sorting finger actuator system also being operable for causing selected ones of the sorting fingers to sort a designated product out of the conveying direction, the designated product comprising one of the products conveyed in the conveying direction and defining a track along the conveying plane having a track width defined by a dimension of the designated product in the transverse direction, the selected ones of the sorting fingers sorting the designated product out of the conveying direction by each of the selected ones of the sorting fingers moving from its conveying position to its sorting position to jointly form a combined gap that encompasses the track defined by the designated product and that permits the designated product to travel there through and out of the conveying direction.

2. The sorter of claim 1 wherein the selected ones of the sorting fingers comprise a set of less than all of the sorting fingers and the sorting finger actuator system is operable to cause each sorting finger other than the selected ones of the sorting fingers to reside in its conveying position while each selected one of the sorting fingers is moved to its sorting position.

3. The sorter of claim 1 wherein the conveying section of at least one of the sorting fingers includes a conveyor belt.

4. The sorter of claim 1 wherein each sorting finger has a portion thereof raised above the conveying plane when in its sorting position.

5. The sorter of claim 4 wherein the portion of each sorting finger raised above the conveying plane when in the respective sorting position includes a sorting flank having a drivable sorting belt with a sorting belt surface facing in a direction opposite to the conveying direction.

6. The sorter of claim 1 wherein each sorting finger is pivotably mounted at a first end thereof so as to be pivotable about a respective sorting finger pivot axis and wherein when the respective sorting finger is moved from its conveying position to its sorting position the respective sorting finger pivots about its sorting finger pivot axis and lowers a second end of the respective sorting finger below the conveying plane.

7. The sorter of claim 6 further comprising:
(a) a number of steering fingers positioned above the conveying plane and beside one another in the transverse direction, each steering finger being movable between a respective steering position and a respective release position; and
(b) a steering finger actuator system operable for causing each of the steering fingers to move from its release position to its steering position, the steering finger actuator system also operable for causing at least a selected one of the steering fingers to move from its release position to its steering position to contact the designated product and steer the designated out of the conveying direction and into the combined gap.

8. The sorter of claim 7 wherein the steering finger actuator system is operable to move each steering finger between its release position and its steering position independently of each other steering finger.

9. The sorter of claim 7 wherein each steering finger has a respective steering flank and wherein when a respective steering finger is in its steering position the steering flank of that respective steering finger faces in a direction opposite to the conveying direction.

10. The sorter of claim 9 wherein the respective steering flank of each steering finger has a drivable steering belt with a steering belt surface facing in a direction opposite to the conveying direction.

11. The sorter of claim 7 wherein each sorting finger is movable between its sorting position and its conveying position by pivoting about a sorting finger pivot axis extending in the transverse direction and each steering finger is movable between its release position and its steering position by pivoting about a steering finger pivot axis.

12. The sorter of claim 7 wherein when a respective one of the steering fingers is in its steering position a portion of that steering finger resides in the gap formed by one of the selected ones of the sorting fingers in its sorting position.

13. The sorter of claim 1 further comprising a detector operable to detect the track of the designated product and wherein the selected ones of the sorting fingers are selected responsive to the track detected by the detector so that the combined gap encompasses the track defined by the designated product.

14. A method of sorting out products from a stream of the products conveyed in a conveying direction along a conveying plane, the method comprising:
(a) determining a track of a designated product, the designated product comprising one of the products in the stream of the products, wherein the track includes (i) a position of the designated product in a transverse direction extending orthogonally to the conveying direction in the conveying plane and (ii) a width of the designated product in the transverse direction;
(b) selecting a subset of sorting fingers from among a set of sorting fingers where the sorting fingers in the set of sorting fingers are located beside one another in the transverse direction, each sorting finger in the set of sorting fingers (i) being movable between a respective sorting position and a respective conveying position and having a conveying section oriented along the conveying direction, (ii) when in the respective conveying position the conveying section of the respective sorting finger aligns with the conveying plane for providing support along a portion of the conveying plane, and (iii) when in the respective sorting position the conveying section of the respective sorting finger is removed from the conveying plane so as to form a respective gap in the conveying plane, wherein each of the sorting fingers in the subset of sorting fingers is selected based upon its location in the track of the designated product so that the subset of sorting fingers jointly encompass the width of the designated product in the transverse direction; and (c) moving each sorting finger included in the subset of sorting fingers from its conveying position to its sorting position to form a sorting gap so that the designated product is sorted out of the stream of the products through the sorting gap.

15. The method of claim 14 wherein the track of the designated product is determined with a camera by image recognition.

16. The method of claim 14 further including determining a position of the designated product in the conveying direction to identify a time at which the designated product reaches the sorting gap responsive to a conveying speed of the designated product.

17. The method of claim 16 wherein the position of the designated product in the conveying direction is determined from camera images of the designated product as it is conveyed in the conveying direction.

18. The method of claim 16 further including determining the conveying speed of the designated product from operational data of a feed belt that conveys the designated product in the conveying direction.

19. The method of claim 14 further comprising:

(a) selecting a subset of one or more steering fingers from among a number of steering fingers positioned above the conveying plane and beside one another in the transverse direction, each steering finger being movable between a respective steering position and a respective release position, wherein each steering finger in the subset of one or more steering fingers is selected based upon its location in the track of the designated product; and (b) moving each steering finger in the subset of one or more steering fingers from its release position to its steering position concurrently with moving each sorting finger included in the subset of sorting fingers from its conveying position to its sorting position.

20. The method of claim 14 further comprising determining the track and a track width in the transverse direction repeatedly for each of the products on the conveying plane.

* * * * *